… … …

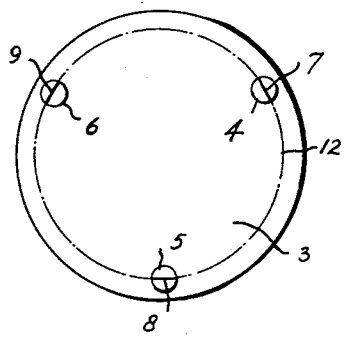
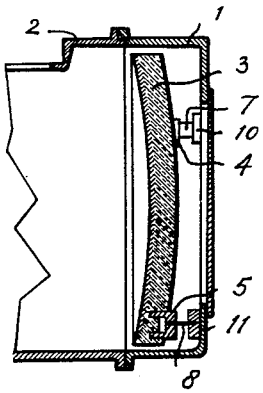
Fig 2  Fig 1
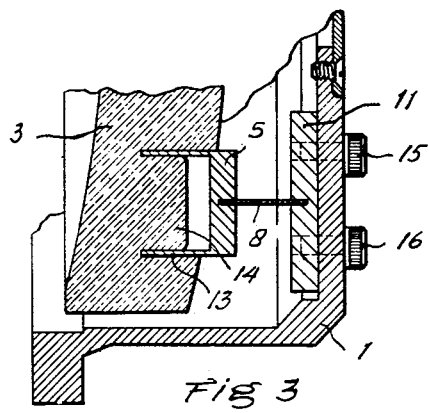
Fig 3
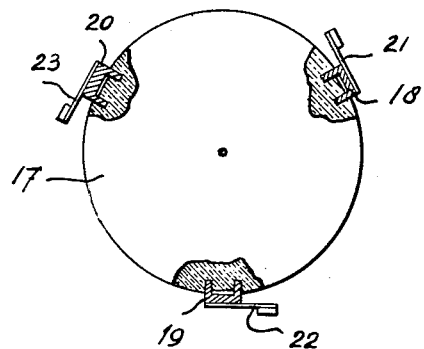
Fig 4

United States Patent Office 3,015,990
Patented Jan. 9, 1962

3,015,990
MOUNTING OF OPTICAL ELEMENTS
Cornelis Otto Jonkers, Wassenaar, Netherlands, assignor to N.V. Optische Industrie "De Oude Delft," Delft, Netherlands, a Netherlands company
Filed Apr. 10, 1959, Ser. No. 805,461
Claims priority, application Netherlands Aug. 11, 1958
7 Claims. (Cl. 88—96)

The invention relates to the mounting of optical elements such as mirrors and lenses.

Certain modern optical instruments e.g. aerial cameras require very precise methods for mounting the parts of the optical system in the instrument housing. Difficulties may be caused by both the required high accuracy as to shape and position of the optically effective surfaces and the steadily increasing dimensions and weight of the optical elements necessitated by the increasing focal lengths and relative apertures of the optical systems.

Much care must be spent to insure that the effective surfaces of the elements are not deformed by the mounting construction when the elements are mounted in the instrument. Such deformations may occur consequent on the own weight of the elements or on clamping forces exerted upon the elements by the mounting construction itself.

In order to minimize the sag of large mirrors under their own weight such mirrors often are no longer mounted along their outer diameter but are supported at preferably three points which are so selected that the sag nowhere exceeds a certain acceptable maximum value. In these cases a considerable gain in weight can be obtained by reducing the thickness of the mirror body, and a loss in luminosity caused by parts of the mounting construction obstructing some of the incident light on its front optically active surface is taken into the bargain.

In order to avoid deformation due to the clamping it has been proposed in one of the best methods on the prior art to use small hemispheres as clamping elements which with their bases are resiliently pressed against the surface of the optical element and with their spherical surfaces are supported in conical recesses connected to the housing of the instrument. The essential point herein is that the hemispheres in the recesses are capable of being slightly tilted about their centers when the optical element is mounted such that eccentric clamping forces cannot be exerted by the hemispheres upon the optical element.

A very important requirement of the mounting construction is that temperature changes, shocks, vibrations or changes in the position of the instrument cannot have a permanent influence on the shape or the centration of the optical elements. Thus, the mounting should be such as to allow a return of the element to the original position after a disturbance whatever the nature of the disturbance may be.

Practice has shown that the mounting construction in prior art of the above described type cannot completely fulfill the requirements described above. It has appeared that with large mirrors which are supported by hemispheres, small lateral displacements of the mirror body and the resulting decentration of the mirror can hardly be avoided during normal operation conditions. It is noted that though such displacements may generally be very small (in the order of some tens of microns) their influence on image quality is appreciable in certain types of instruments.

This type of known mounting does not provide, furthermore, a perfectly well defined adjustment of the associated optical element. Upon temporary changes in the temperature or shocks and vibrations the original situation is not completely restored which may result in a small and lasting reduction of image quality.

Although a full explanation of these effects is difficult to give it can very probably be said that in known mountings the frictional joint between the hemispheres and the glass surfaces is at least partly responsible for them since on one hand it permits the optical element too easily to be displaced laterally and on the other hand makes it difficult for the optical element to fully return to the original position upon shocks etc.

It is a principal object of the invention to provide a mounting for optical elements in which the above deficiencies are avoided. A further object is to provide a mounting for optical mirrors causing no loss of light due to some of its parts being in the path of the light rays incident on the optically active or front surface of the mirror.

In accordance with the general concept of the invention an optical element comprises a number of holes, preferably three, which are drilled into an optically inactive surface of the optical element but do not extend to the opposite surface. Into these holes metal cups having a relatively thin wall are inserted and cemented to the surrounding glass. Resilient supporting members, preferably spring blades, are secured at one end to the bottom of the metal cups and the other end to the housing of the instrument so as to compensate for differential contractions and extensions between the optical element and the housing.

The objects and features of the invention will be best understood by reading the following description of some embodiments thereof, reference being had to the accompanying drawings in which FIG. 1 is an axial cross-sectional view of a portion of an optical instrument having a concave mirror mounted therein;

FIG. 2 is an elevational view of the mirror body shown in FIG. 1 viewed from the rear;

FIG. 3 is a detail of the construction of FIG. 1 on a larger scale;

FIG. 4 is a view, partly in elevation, partly in section, of a modified form of the mounting according to the invention.

In FIG. 1 the mirror body is mounted on the cover 1 of the instrument housing 2. The mirror body is provided with a reflective cover on its front or optically active concave surface and has a meniscus shape. It is supported by three cylindrical cups 4, 5 and 6 which are cemented into cylindrical holes drilled into the convex rear or optically inactive surface of the mirror body 3. The cups have a thin wall section 13 and a relatively thick bottom section (FIG. 3). The glass in the holes has not been removed completely such that a central block 14 is obtained which extends inside the wall section of the cup. The diameter of these blocks is preferably selected such that the cups at normal temperature can be loosely inserted into the cylindrical grooves formed between said central block 14 and the mirror body.

Each of the cups 4, 5 and 6 is provided with a groove in its bottom in which blade springs 7, 8 or 9 are fixed e.g. by soldering. The other ends of the springs are likewise rigidly fixed in grooves of mounting plates of which only two designated 10 and 11 are visible in FIG. 1. These plates are not shown in FIG. 2 as the latter figure is a transverse section through the blade springs 7, 8 and 9.

As best seen in FIG. 3, the plates such as 11 are secured to the cover 1 of the instrument housing by means of screws such as 15 and 16. In order to avoid stresses set up in the mirror body 3 when this body is mounted the following procedure is advisable. After the mounting plates such as 11, together with the blades and cups fixed thereto have been provisionally secured to the cover 1, the mirror body provided with the holes is tried. If the cups do not slip easily into the holes the position of the cups is varied by small lateral displacements of the plates, by shaping the opposite faces of the plates and the cover or by applying shims etc. until all of the cups slip smoothly into the holes. Only then the mounting plates are definitely secured and the mirror body cemented on the cups.

The mounting construction illustrated has the following advantages. Frictional clampings have been completely eliminated so that permanent changes in the position of the mirror body are made impossible. Nevertheless, when differential expansions and contractions occur between the mirror body and the housing due to changes in temperature these are easily compensated by the blade springs 7, 8 and 9. As may be seen from FIGS. 1 and 2 these blade springs are positioned in planes tangential to a circle 12 which has its center on the axis of the optical element and extend parallel to said axis, and may be easily bent in radial direction. As the joints between the blades and the mirror body by means of the cups is completely rigid the mirror will always exactly return to its original position after some temporary displacement.

The mirror body is supported in three points situated on a circle having a diameter smaller than the outer diameter of the mirror, whereby deformations due to the own weight of the mirror body are reduced. However, the mounting construction has no parts projecting in front of the mirror into the light beams incident on the optically active surface of the mirror so that a loss of luminosity is avoided.

In FIG. 4 a modification of the mounting construction is shown which may be applied to both large lenses and mirror bodies having a cylindrical peripheral surface. As seen in the drawing the optical element 17 is supported in three points along its circumference, spaced apart by angles of 120°. In cylindrical holes radially drilled into the optically inactive peripheral surface of the element, cups 18, 19 and 20 are cemented. Secured to the bottom of these cups are blade springs 21, 22 and 23 which are positioned in planes substantially tangential to the optical element and may be fixed at their other ends to the instrument housing (not shown) by screws or any other means. It will be appreciated that in FIG. 4 again radial expansion or contraction of the optical element is compensated by deformation of the blades 21–23 and cannot cause any decentering of the element thanks to the rigid cemented connection between the blades and the element. This joint is very stable and withstands changes in temperature very well. The thin wall of each of the cups compensates for differences in contraction or expansion between each of the cups and the glass surrounding it whereby loosening of the cement and heavy stresses in the optical element are avoided.

What I claim is:

1. In an optical instrument, in combination, a housing, and an optical element having a front optically active surface and a rear surface in said housing, a center axis normal to said surfaces, a plurality of recesses symmetrically spaced apart behind said optically active front surface, supporting means connected to said housing for supporting said optical element in said housing in optical operative alignment, said recesses in said optical element being cylindrical in shape and having their axes substantially parallel to said center axis of said optical element, said supporting means comprising a plurality of metal cups each having a thin cylindrical side wall section whose outer diameter is slightly smaller than the diameter of said recesses, said side wall sections of said cups being cemented in said recesses, and a plurality of supporting spring blade members, each secured at one end to an associated metal cup and at the other end to said housing, said spring blade members lying in planes tangential to the optical element and compensating for differential radial contractions and expansions between said optical element and said housing.

2. In an optical instrument, in combination, a housing, a front surface mirror body having a center axis normal to said body, a plurality of recesses in its rear surface symmetrically spaced apart over said rear surface, said recesses having a cylindrical side wall and having their axes parallel to the center axis of said mirror, a plurality of metal cups having a thin cylindrical side wall section and a thick bottom section, the diameter of said recesses in said mirror body slightly exceeding the outer diameter of said side wall sections of said metal cups and said side wall sections being cemented in said recesses, and blade springs secured at one end to said bottom section of said metal cups and at the opposite end to said housing, said blade springs respectively lying in planes, each said blade spring tangential to a circle having its center on the center axis of the mirror and extending substantially parallel to said center axis thereby compensating for differential radial contractions and expansions between said mirror body and said housing.

3. In an optical instrument, the combination of claim 1 wherein said recesses are in the shape of a cylindrical groove having a width slightly exceeding the thickness of the side wall portions of said metal cups.

4. A mounting for suppotring an optical element having a center axis, and a front and rear surface normal to said center axis, said mounting comprising; a supporting structure, a plurality of metal cups with relatively thin sides and thick bottoms for engaging and being cemented in holes defined in the rear surface of said optical element, said holes being equally spaced, radially from the center axis of said element and circumferentially from each other, a plurality of elongated spring blades, each blade having two ends and each blade being secured by one said end to the bottom of an associated cup and by the other end to said supporting structure, each said blades being positioned in a plane tangential at each securing point to a circle having its center on said center axis of said optical element, said blade extending parallel to said center axis, whereby said optical element is supported in said structure free of any mounting obstruction on its forward surface and resiliently supported in said structure to return precisely to its original position after a possible temporary displacement.

5. A mounting for supporting an optical element having a center, a perimeter and a front and rear surface, said mounting comprising, a supporting structure, a plurality of metal cups with relatively thin sides and thick bottoms for engaging and being cemented in holes defined and equally spaced, circumferentially in the perimeter of said optical element, a plurality of elongated spring blades, each blade having two ends and each blade being secured by one said end to the bottom of an associated cup and by the other end to said supporting structure, said blades being positioned in planes respectively tangentially at each securing point to the perimeter of said optical element, whereby said optical element is supported in said structure free of any mounting obstruction on its forward surface and resiliently supported in said structure to return precisely to its original position after a possible temporary displacement.

6. A mounted optical element comprising in combination a rigid supporting structure, an optical element having the center axis normal thereto and a plurality of holes drilled into but not perforating said element, metal cups having relatively thin walls and thick bottoms fitting in each of said holes bottoms outward and having their walls cemented respectively therein, resilient supporting members, each having an end secured to an associated cup bottom and the other end secured to said supporting structure, said resilient members each extending therebetween and having the direction of the greatest resiliency radial to said center axis of said optical element, whereby said optical element is supported in said structure free of any mounting obstruction to its nonperforated part and is supported to return to its original shape and position after a possible temporary deviation therefrom.

7. A mounted optical front surface mirror body comprising a rigid supporting structure, a mirror body having on its front surface a mirror and having a plurality of regularly spaced apart holes defined in its rear surface, said holes not perforating said front surface, a plurality of hollow metal cups, each having a relatively thin wall section, respectively conforming in shape to said holes and being cemented therein and a thick bottom section extending outwardly from said holes, and a plurality of blade spring members each being secured at one end to an associated cup bottom and at the other end to said supporting structure, said spring members being positioned for bending in directions radial to an axis perpendicular to said mirror whereby said mirror body is supported in said structure free of any mounting obstruction to said front surface mirror and is supported to return to its original shape and position after a possible temporary deviation therefrom.

References Cited in the file of this patent

UNITED STATES PATENTS

| | | |
|---|---|---|
| 1,109,189 | Uhlemann | Sept. 1, 1914 |
| 1,190,932 | Meyrowitz | July 11, 1916 |
| 1,688,425 | La Hodny et al. | Oct. 23, 1928 |
| 1,877,089 | Uhlemann | Sept. 13, 1932 |
| 2,081,299 | Hill | May 25, 1937 |
| 2,081,608 | Stolper | May 25, 1937 |
| 2,089,750 | Kerry | Aug. 10, 1937 |
| 2,872,843 | Kono | Feb. 10, 1959 |

FOREIGN PATENTS

| | | |
|---|---|---|
| 537,637 | Great Britain | June 30, 1941 |
| 890,272 | Germany | Sept. 17, 1953 |